United States Patent Office 2,904,466
Patented Sept. 15, 1959

2,904,466

PRESERVATIVE COMPOSITION COMPRISING TETRAALKALI METAL PYROPHOSPHATE, A POLYCHLOROPHENATE AND A HEAVY METAL SALT

Songe S. Sakornbut, Kirkwood, Mo., assignor to Monsanto Chemical Company, St. Louis, Mo., a corporation of Delaware No Drawing. Application September 6, 1956
Serial No. 608,198

14 Claims. (Cl. 167—38.5)

This invention relates to novel preservative compositions and to the method of using such compositions to protect textiles, wood, paper, and other fibrous cellulosic materials from the deleterious action of fungi, insects, and other cellulose-destroying organisms.

There are many substances which could serve as cellulose-preserving agents, but which are very insoluble in media which are commonly used in treating textiles and other fibrous cellulosic materials. As a consequence, these preservative agents have not been used extensively in the treatment of such materials. In order for these agents to render textiles and other materials permanently fungus-proof, the preservative must be present within the materials in sufficient concentration so that, even when some of the preservative is lost by leaching, weathering, or washing processes, there is still sufficient of the preservative present to provide protection against the cellulose-destroying organisms. Copper pentachlorophenate, zinc pentachlorophenate, and nickel pentachlorophenate are representative of the very insoluble preservative agents which, while possessing excellent preservative properties, heretofore have found very small use as preservative agents for textiles and woods in particular, because sufficient quantities could not be economically incorporated by any of the known methods.

Previous methods used to form such metal polychlorophenates within the interstices of a textile, for instance, have required the treatment of the material with a water-soluble salt of the phenolic compound, an intermediate drying step, and a final treatment with a water-soluble salt of the appropriate metal, whereby the metal-organic salt is formed in situ. This two-bath method requires additional equipment and therefore results in increased cost for the application of the treatment.

A one-bath method has been proposed which involves the use of ammonia and a water-miscible organic solvent. The prominent disadvantage in such a treatment is the objectionable vapors resulting from the use of ammonia, both in the impregnation stage and the drying stage of this method, particularly where the operation is carried out indoors. In addition, considerable quantities of water-miscible organic solvent are consumed in this process, which results in high production costs.

One of the objects of the present invention is to provide a process whereby textiles, wood, cordage, paper, and other cellulosic materials may be impregnated with sufficient amount of relatively insoluble metal polychlorophenates in a single immersion to render the subsequently dried cellulosic material permanently and effectively resistant to the attack of fungi, insects, and other cellulose-destroying organisms.

A further object is to provide a novel preservative composition in which water is the only solvent used. Other objects will become apparent from the following description and examples.

The improved preservative composition of the present invention comprises an aqueous solution of a water-soluble polychlorophenate, a tetraalkali metal pyrophosphate, and a salt of a heavy metal. All of the components of the composition remain in solution during storage and prior to use. The process for preserving textiles and other cellulosic materials by means of the composition of this invention comprises impregnating the materials with the solution, removing the impregnated materials from the solution, and drying the impregnated materials. On contact with the cellulosic material and during the drying process, the heavy metal ions react with the polychlorophenate ions to precipitate the respective metal polychlorophenates within the interstices of the impregnated materials. The precipitation is not completely instantaneous, however, as a partial precipitation takes place on contact of the cellulosic material with the composition, while a major part of the precipitation process occurs during the drying step of the operation. The impregnation may be accomplished in any desired manner, for example, by immersion in a vessel containing the composition, with or without the aid of squeeze rolls, either as a bath or continuous operation, including those methods in which decreased or increased pressure or both are used. For some types of application, the composition may be brushed on the fabric, paper, or wood article. Likewise, the drying operation may be accomplished in any desired manner, for example, by exposing the respective surfaces of the treated article simultaneously or successively to air streams which may be at room temperature or at higher temperatures below the charring point of the cellulosic materials. Textiles, wood, cordage, and paper treated with the composition of the present invention are found to be highly resistant to the action of fungi, insects, and other cellulose-destroying organisms. Moreover, the resistance is characterized by a high degree of permanency even when the treated cellulosic material is subjected to severe weathering or leaching conditions.

The novel composition of this invention can be formed in a number of ways. For example, one method comprises dissolving the heavy metal salt in water, adding sufficient tetraalkali metal pyrophosphate for the formation of the phosphato-metallic complex, agitating until the initially formed precipitate is dissolved, and then adding the water-soluble polychlorophenate. The solution is then thoroughly agitated and the resulting solution contains substantially no insoluble material.

In the preferred method of making the preservative composition of this invention, the tetraalkali metal pyrophosphate is dissolved in water and the heavy metal salt is added with vigorous agitation. While a precipitate is formed initially, upon further agitation, this precipitate dissolves. The water-soluble polychlorophenate is added and agitation is continued until the composition is homogeneous.

If the presence of soluble salts such as sodium sulfate, sodium chloride, and the like, is undesirable for a particular adaptation of the solution, an alternate procedure for the preparation of the composition may be employed. In this process, the desired heavy metal polychlorophenate is dissolved in an aqueous solution of a tetraalkali metal pyrophosphate. The pyrophosphato-metallic complex formed by the reaction of the tetraalkali metal pyrophosphate with the heavy metal polychlorophenate remains in solution until it comes in contact with a cellulosic material, whereupon the aforedescribed progressive precipitation process takes place.

The preservative in this composition is, of course, the heavy metal polychlorophenate which is formed by the reaction of the pyrophosphato-metallic complex with the polychlorophenate in contact with the cellulosic material. The concentration of preservative agent may be varied over a wide range, depending upon the particular preservative agent selected, the amount of agent which is absorbed from the composition in the treatment of a particular type of cellulosic material, and the amount of the preservative agent which is desired in the cellulosic material after the treatment. In general, desirable concentrations of the preservative agent in the composition of the present invention may range from ½ percent or less to 5 percent or more.

The alkali metal salts of the tri-, tetra-, and pentachlorophenols are generally useful in this invention; however, sodium pentachlorophenate is preferred because of its low cost.

Tetraalkali metal pyrophosphates in general are useful in the composition of this invention, tetrasodium pyrophosphate being preferred for economic reasons.

Although any salt of a heavy metal, that is, a metal which has a specific gravity greater than four, is generally useful in the present invention, the water-soluble salts of copper, zinc, and nickel are preferred because of the high biological activity of the corresponding polychlorophenates.

The proportions of the various components used in the composition may be varied; however, the quantity of the heavy metal salt and of the water-soluble polychlorophenate will depend upon the concentration of the preservative agent that is desired in the treated cellulosic material. The amount of tetraalkali metal pyrophosphate will be governed by the amount of heavy metal salt present; that is, a sufficient amount of tetraalkali metal pyrophosphate must be added to sequester the heavy metal salt present. Additional tetraalkali metal pyrophosphate can be added to delay the precipitation of the metal polychlorophenate within the cellulosic material, for example, where the material to be treated is timber of large dimensions. Thus, by delaying the precipitation of the preservative agent, deeper penetration of the wood is facilitated.

In the above-described alternate process, a sufficient amount of tetraalkali metal pyrophosphate is added so as to solubilize the heavy metal polychlorophenate.

The optimum proportions of the heavy metal salt and tetraalkali metal pyrophosphate will vary with the cation and anion of each heavy metal salt. An anion derived from a weak acid, such as acetic, will require a much smaller amount of tetraalkali pyrophosphate than an anion derived from a strong acid, such as sulfuric. However, a range of proportions of the heavy metal salt to tetraalkali pyrophosphate has been determined by testing a large number of heavy metal salts with tetrasodium pyrophosphate. Therefore, the broad range of proportions (based on one mole of a tetraalkali pyrophosphate) contemplated is:

| | Moles |
|---|---|
| Heavy metal salt | 0.07–3 |
| Polychlorophenate | 0.50–12 |

The preferred range is 0.25 to 1.3 moles of heavy metal salt per mole of tetraalkali metal pyrophosphate.

The following examples serve to illustrate the process of the present invention. This invention, however, is not limited to these examples, but contemplates various embodiments and modifications of the invention as described and illustrated herein. In the examples, all parts are by weight unless specified otherwise.

*Example 1*

To 100 parts of water is added 1.60 parts of tetrasodium pyrophosphate. To this solution is added with stirring 0.94 part of cupric sulfate pentahydrate with initial formation of a precipitate. As soon as this precipitate is re-dissolved, 2.17 parts of sodium pentachlorophenate is added. The resulting mixture is stable and remains blue and clear until it comes into contact with wood or other cellulosic material.

A specimen of 8.25 oz. duck fabric is immersed in the above-described composition for about five minutes. The fabric is then removed from the solution, and the fabric is drained free from excess solution. The impregnated fabric is then dried.

In order to test the effectiveness and permanency of the treatment, the treated fabric is leached for 500 hours in tap water. Following the 500-hour leaching, the fabric does not support the growth of test micro-organisms to which it is subjected, nor does it lose tensile strength when subjected to a soil burial test. Test micro-organisms which are employed in such a test are the common textile mildew organisms, such as *Aspergillus niger*, *Chaetomium globosum*, Metarrhizium sp., and Penicillium sp.

*Example 2*

Employing the procedure of Example 1, using the stated amounts of the water-soluble metal salts (column 1) of tetrasodium pyrophosphate (column 2) and of sodium pentachlorophenate (column 3), stable aqueous solutions of these components are obtained. All amounts are given in parts per 100 parts of water.

| Column 1 | | Column 2 | Column 3 |
|---|---|---|---|
| Water-soluble metal salt | Parts | Tetrasodium pyrophosphate | Sodium pentachlorophenate |
| Cupric sulfate pentahydrate | 2.34 | 4.00 | 5.43 |
| Cupric acetate monohydrate | 0.99 | 2.00 | 2.86 |
| Cupric nitrate trihydrate | 1.03 | 2.00 | 2.45 |
| Cupric chloride | 0.98 | 3.00 | 4.07 |
| Zinc sulfate heptahydrate | 1.60 | 3.00 | 3.21 |
| Zinc chloride | 0.90 | 3.00 | 3.80 |
| Di(cadmium chloride) pentahydrate | 1.99 | 10.00 | 5.03 |
| Nickel sulfate hexahydrate | 2.52 | 2.00 | 5.52 |

All of the above solutions are stable and remain so until contacted with a cellulosic material. Duck fabric treated with each of the above solutions according to the method of Example 1, does not support the growth of the above-mentioned test micro-organisms.

*Example 3*

As an alternative, a preservative composition which does not result in soluble salts, such as sodium sulfate, etc., being formed in the treated material, is prepared by dispersing 3.00 parts of copper pentachlorophenate in 100 parts of water and then adding with vigorous stirring 2.50 parts of tetrasodium pyrophosphate until all the copper pentachlorophenate is dissolved. The resulting solution remains stable and, on contact with wood, copper pentachlorophenate is precipitated.

*Example 4*

A composition containing the following ingredients is prepared according to the method of Example 1:

| | Parts |
|---|---|
| Tetrasodium pyrophosphate | 0.36 |
| Sodium pentachlorophenate | 0.49 |
| Copper sulfate anhydrous | 0.14 |
| Water | 100.00 |
| Total | 100.99 |

When tested by the "ASTM Tentative Method of Testing Wood Preservatives by Laboratory Soil-Block Cultures," the above composition is found to contain the minimum concentration needed to treat ponderosa pine blocks for preservation against *Lenzites trabea* and *Poria monticola*, whereas 70 percent of this concentration is sufficient for prevention of decay by *Lentinus lepideus*.

Example 5

The following solution is prepared according to the method of Example 1:

| | Parts |
|---|---|
| Tetrasodium pyrophosphate | 5.00 |
| Copper sulfate pentahydrate | 2.90 |
| Sodium pentachlorophenate | 6.74 |
| Water | 100.00 |
| Total | 114.64 |

This composition is used to impregnate a series of wood panels by treating the specimens to refusal and thereafter drying them. These panels are installed in salt water (pH=8.4) in a southern Florida location for a period of 10 months. The treated wood is found to be highly resistant to the attack of marine borers, such as Teredo, Bankia, Martesia, and Limnoria.

Other sequestering agents such as sodium citrate and tetrasodium ethylenediaminetetraacetate were found to be quite effective in solubilizing the copper pentachlorophenate system, but the complexes thus formed were too permanent, as the copper pentachlorophenate could not be readily precipitated in the cellulosic material.

Although other alkali polyphosphates, such as $Na_5P_3O_{10}$, $Na_8P_6O_{19}$, etc., up to $Na_{16}P_{14}O_{43}$, can also effectively sequester heavy metal ions under most conditions, they cannot sequester these heavy metal ions in the presence of polychlorophenate ions.

The preservative compositions of this invention may be modified by the addition thereto of secondary materials, such as wetting agents, water repellants, insect repellants, fire retardants, substances which exert a synergistic action on the metal chlorophenates and other materials having a favorable action on the impregnation or penetration of the composition, or have a desirable action in further protecting or enhancing the value of the treated article.

The process of the present invention may be applied to any fibrous cellulosic material, such as textile, paper, wood, cork, cordage, etc. The conditions of treatment, including the concentration of the preservative agent, the proportion of the sequestering agent to the metal salt, the time of treatment, and the time and temperature of drying the impregnated material, may be varied within wide limits, and such variations are contemplated as being within the scope of this invention.

It is to be understood that the foregoing description is but a preferred embodiment of the invention and that changes and modifications may be made therein without departing substantially from the invention which is defined in the appended claims.

What is claimed is:

1. A preservative composition which comprises an aqueous solution of a tetraalkali metal pyrophosphate containing dissolved therein a water-soluble polychlorophenate and a heavy metal salt.

2. A preservative composition which comprises an aqueous solution of a tetraalkali metal pyrophosphate containing dissolved therein a water-soluble polychlorophenate and a salt of a heavy metal selected from the group consisting of copper, zinc, and nickel.

3. A preservative composition which comprises an aqueous solution of tetrasodium pyrophosphate containing dissolved therein from 0.05 to 12 moles of water-soluble pentachlorophenate per mole of tetrasodium pyrophosphate and from 0.07 to 3 moles of heavy metal salt per mole of tetrasodium pyrophosphate.

4. A preservative composition which comprises an aqueous solution of tetrasodium pyrophosphate containing dissolved therein from 0.05 to 12 moles of water-soluble pentachlorophenate per mole of tetrasodium pyrophosphate and from 0.25 to 1.3 moles of heavy metal salt per mole of tetrasodium pyrophosphate.

5. The composition of claim 4 in which the heavy metal is copper.

6. The composition of claim 4 in which the heavy metal is zinc.

7. The composition of claim 4 in which the heavy metal is nickel.

8. The process of rendering cellulosic materials resistant to attack by fungi, insects, and other cellulose-destroying organisms, which comprises impregnating said materials with a preservative composition comprising an aqueous solution of a tetraalkali metal pyrophosphate containing dissolved therein a water-soluble polychlorophenate and a heavy metal salt, and thereafter drying the impregnated materials.

9. The process of rendering cellulosic materials resistant to attack by fungi, insects, and other cellulose-destroying organisms, which comprises impregnating said materials with a preservative composition comprising an aqueous solution of a tetraalkali metal pyrophosphate containing dissolved therein a water-soluble polychlorophenate and a salt of a heavy metal selected from the group consisting of copper, zinc, and nickel, and thereafter drying the impregnated materials.

10. The process of rendering cellulosic materials resistant to attack by fungi, insects, and other cellulose-destroying organisms, which comprises impregnating said materials with a preservative composition comprising an aqueous solution of tetrasodium pyrophosphate containing dissolved therein from 0.50 to 12 moles of water-soluble pentachlorophenate per mole of tetrasodium pyrophosphate and from 0.07 to 3 moles of heavy metal salt per mole of tetrasodium pyrophosphate, and thereafter drying the impregnated materials.

11. The process of rendering cellulosic materials resistant to attack by fungi, insects, and other cellulose-destroying organisms, which comprises impregnating said materials with a preservative composition comprising an aqueous solution of tetrasodium pyrophosphate containing dissolved therein from 0.50 to 12 moles of water-soluble pentachlorophenate per mole of tetrasodium pyrophosphate and from 0.25 to 1.3 moles of heavy metal salt per mole of tetrasodium pyrophosphate, and thereafter drying the impregnated materials.

12. The process of claim 11 in which the heavy metal is copper.

13. The process of claim 11 in which the heavy metal is zinc.

14. The process of claim 11 in which the heavy metal is nickel.

References Cited in the file of this patent

UNITED STATES PATENTS

| 1,057,076 | Monseur | Mar. 25, 1913 |
|---|---|---|
| 2,086,867 | Hall | July 13, 1937 |
| 2,229,420 | Neugebauer | Jan. 21, 1941 |
| 2,322,633 | Hitchens | June 22, 1943 |
| 2,637,661 | Benignus | May 5, 1953 |
| 2,856,330 | Vagenius | Oct. 14, 1958 |

FOREIGN PATENTS

| 23,139 | Great Britain | Jan. 20, 1913 |
|---|---|---|
| 650,832 | Great Britain | Mar. 7, 1951 |

OTHER REFERENCES

Paper Trade Jour., vol. 135: 19, Nov. 7, 1952, p. 34 (art. titled Copper-Based Fungicides).